United States Patent [19]
Helmolt, Sr.

[11] 3,884,800
[45] May 20, 1975

[54] AUTOMATIC SORTING AUGER CONVEYER

[75] Inventor: Wendell R. Helmolt, Sr., Windsor, Conn.

[73] Assignee: Polymer Machinery Corporation, Berlin, Conn.

[22] Filed: Aug. 16, 1974

[21] Appl. No.: 498,133

[52] U.S. Cl. .................................. 209/82; 198/64
[51] Int. Cl. ............................................ B07b 13/04
[58] Field of Search ......... 209/82, 83, 85, 97, 74 R; 198/64

[56] References Cited
UNITED STATES PATENTS

| | | | |
|---|---|---|---|
| 2,359,890 | 10/1944 | Birdsall | 209/82 |
| 3,023,898 | 3/1962 | Martin | 209/82 |
| 3,172,588 | 3/1965 | Bertold | 209/85 X |
| 3,327,847 | 6/1967 | Lockshaw | 209/74 R |

Primary Examiner—Robert B. Reeves
Assistant Examiner—Thomas E. Kocovsky
Attorney, Agent, or Firm—Spencer & Kaye

[57] ABSTRACT

An improved auger conveyer for use with a grinder for the waste plastic runners resulting from a multi-cavity molding process, which conveyer automatically sorts molded parts from the runners. The auger conveyer comprises an elongated trough, with at least a first side wall which is inclined and slopes downwardly and inwardly, an auger rotatably mounted in the trough and having one end which extends through an opening in one of the end walls of the trough, which end wall is connectable to a grinder. The pitch of the auger helix is less than the length of the runners and greater than the length of the molded parts to be separated, and the bottom of the trough beneath the auger is provided with an elongated opening of a width sufficient to pass the molded parts. Fastened to the above-mentioned first side wall below the locus of the longitudinal axis of the auger and extending along the entire length of the opening is a member for preventing any runners from sliding along the side wall and through the opening in the trough. Additionally, a plate is fastened to the opposite side wall of the trough and extends laterally therefrom so as to cover at least one-half of the auger, with the clearance between the plate and the auger being substantially less than the thickness of a runner. Consequently, when the auger is rotated in a direction toward the edge of the plate, any molded parts supplied to the trough will fall through the auger helix and out the bottom opening in the trough while the runners supplied to the trough will be carried along by the auger toward the grinder.

8 Claims, 2 Drawing Figures

AUTOMATIC SORTING AUGER CONVEYER

BACKGROUND OF THE INVENTION

The present invention relates to an auger conveyer of the type used with grinders for the comminution of plastic waste material resulting from a multi-cavity molding process. More particularly, the present invention relates to a modified auger conveyer of the above-mentioned type which will not only convey the plastic waste material or runners to the grinder but moreover will automatically sort the molded plastic parts from the runners.

During the production of molded plastic parts in a multi-cavity mold by means of an injection molding process, the molded plastic parts are initially interconnected by means of further plastic portions which are called "runners" and which constitute waste material for the injection molding process. The molded plastic parts are then separated from the runners, usually in the molding machine itself, and the plastic parts and runners are then sorted. The runners, which are substantially larger than the individual plastic parts and constitute a substantial amount of waste material, are then fed to a grinder wherein the runners are comminuted so that the resulting plastic material may be used again.

In the usual arrangement, the parts and runners discharged by the molding machine are fed to a sorting apparatus which sorts out the molded parts and conveys the runners to a conventional auger conveyer which is attached to and conveys the runners to a grinder. Examples of such grinders with attached auger conveyers are, for example, the model 912A and 68A grinder sold by the Polymer Machinery Corporation of Berlin, Conn. In such arrangements, separate pieces of apparatus are required to sort the molded plastic parts from the runner, i.e. the sorter, and then to convey the runners to the grinder, i.e. the auger conveyer.

BRIEF SUMMARY OF THE INVENTION

It is an object of the present invention to provide an improved auger conveyer arrangement for such a grinder which will not only convey the runners to the grinder but moreover will automatically and simultaneously sort the molded plastic parts from the runners, thus avoiding the need for a separate sorting apparatus.

The above object is achieved according to the present invention by an auger conveyer for use with a grinder for plastic waste material which comprises an elongated trough have opposed end walls one of which is provided with a circular opening and is connectable to the grinder and first and second side walls with at least the first side wall being inclined and sloping downwardly and inwardly toward the bottom of the trough; an auger rotatably mounted in the bottom of the trough and having one end thereof extending through the opening, the pitch of the auger helix being less than the length of the runners and greater than the length of the molded parts to be sorted; an elongated opening of a width sufficient to pass the molded parts in the bottom of the trough beneath the auger and extending from the end wall of the trough opposite that connectable to the grinder along a substantial portion of the length of the auger; a plate fastened to the second side wall of the trough and extending laterally therefrom so as to cover at least one-half of the auger with the clearance between the plate and the auger being substantially less than the thickness of a runner; and means fastened to the first side wall below the locus of the longitudinal axis of the auger and extending along the entire length of the opening for preventing any runners from sliding along the first side wall and through the opening. With this arrangement, when the auger is rotated in a direction toward the edge of the plate, the molded parts supplied to the trough will pass through the auger helix and fall out of the trough through the bottom opening, while the runners will be carried along by the helix and conveyed to the grinder.

According to the preferred embodiment of the invention, the plate attached to the second wall is parallel to a tangent to the auger at the uppermost point thereof and covers one-half of the auger, the means attached to the first side wall for preventing any runners from sliding therealong and through the opening comprises a circular rod fastened to the first side wall and extending therealong substantially parallel to the axis of rotation of the auger, and at least a portion of the first side wall which extends along the opening forms an angle of approximately 50° with a horizontal plane containing the longitudinal axis of the auger and is perpendicular to the radius of the auger passing through the rod.

DETAILED DESCRIPTION OF THE PREFERRED EMBODIMENTS

Figure 1:
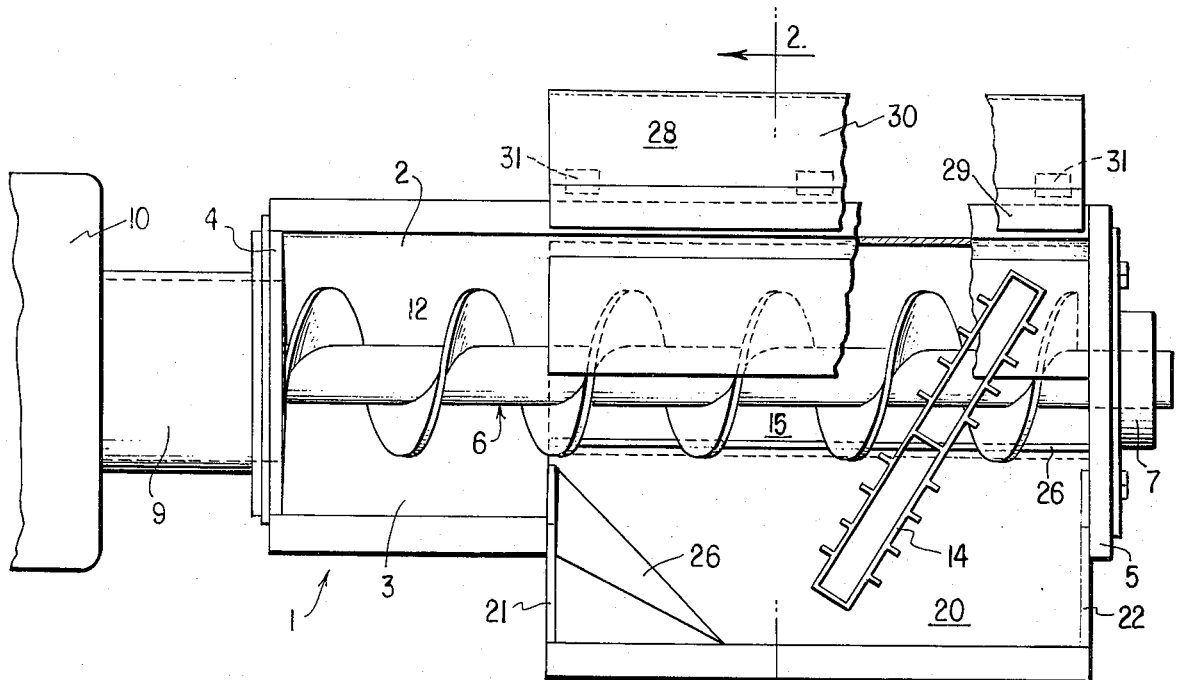
FIG. 1 is a top plan view of an automatic sorting auger conveyer according to the invention.
Figure 2:
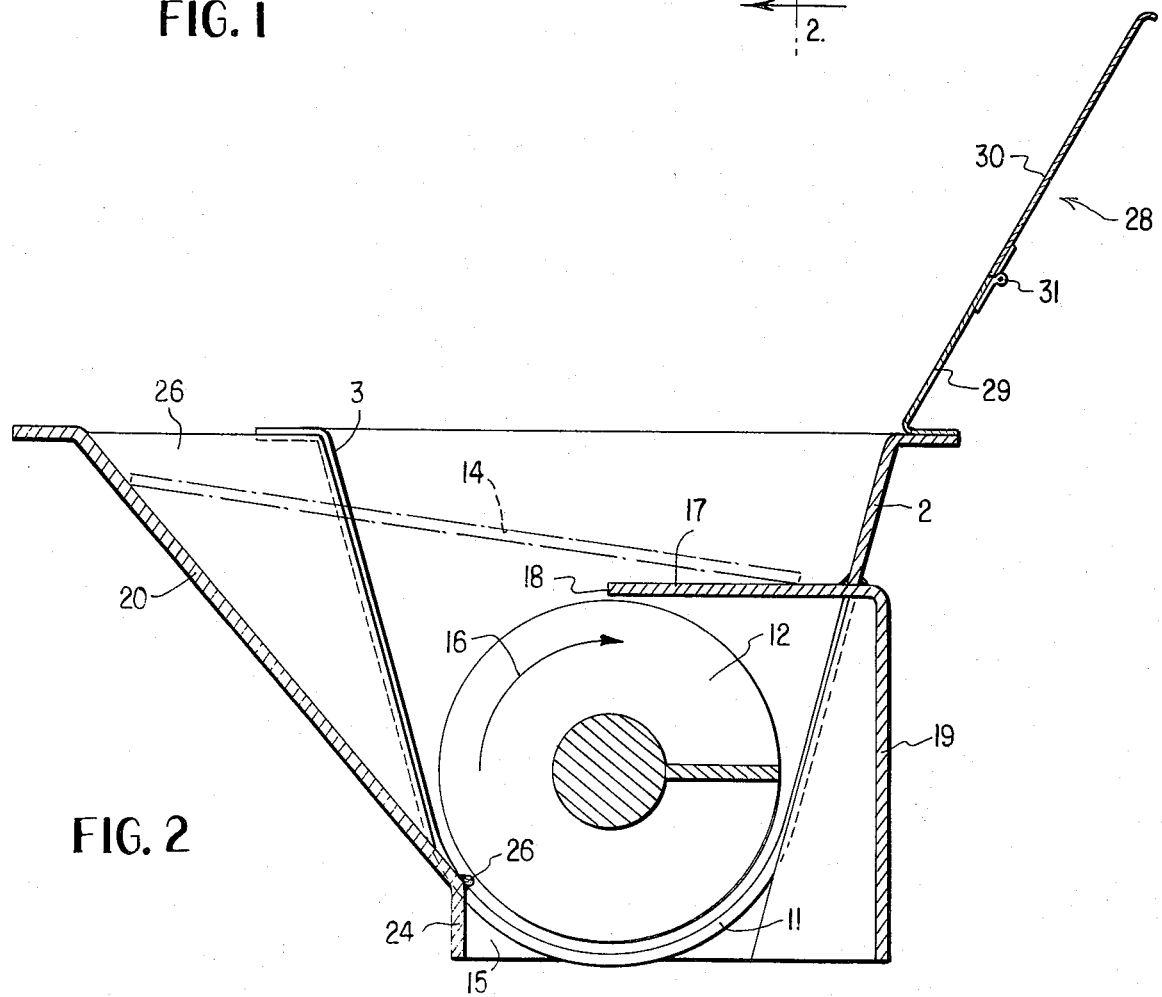
FIG. 2 is a cross-sectional view of the automatic sorting auger conveyer of FIG. 1 taken along the line II—II of FIG. 1.

Referring now to the figures, there is shown an auger conveyer having a trough 1 with inclined side walls 2 and 3 and which slope inwardly and downwardly toward the bottom of the trough, and a pair of opposed parallel end walls 4 and 5. In a conventional manner, an auger 6 is disposed within the trough 1 adjacent the bottom thereof, with one end of the auger being rotatably supported in the end wall 5 by means of a bearing 7. The opposite end of the auger 6 extends through an opening in the end wall 4 and a tube or pipe 9, which connects the end wall 4 (and hence the trough 1) to the supply bin 10 of the grinder, into the supply bin 10 where it is attached to a motor (not shown) for rotating the auger 6. As is best shown in FIG. 2, the bottom 11 of the trough 1, which in the trough according to the invention only exists in the portion thereof adjacent the end wall 4, is arcuate shaped and conforms to the periphery of the auger helix 12.

In an auger conveyer of conventional design, the elongated trough 1 would be entirely formed as in the portion of the illustrated trough adjacent the end wall 4 so that any plastic runners, such as the runner 14, supplied to the trough will be conveyed by the auger through the tube 9 and into the supply bin 10 of the grinder. According to the invention, however, the trough is modified so that both the runners and the parts may be supplied to the trough which will then simultaneously sort the parts from the runners and convey the runners in the conventional fashion. The modification of the trough 1 initially involved the provision of an elongated opening 15 in the bottom of the trough which extends from the side wall 1 for a substantial portion of the length of the auger 6. The opening 15 must have a width which is greater than the length of the plastic parts to be sorted, which parts are conventionally much smaller than the runners. According to the preferred embodiment of the invention, the opening 15 is formed by removing the entire bottom of the trough 1 for the desired length, which in the illustrated embodiment is approximately two-thirds of the length of the trough 1.

In addition to modifying the conventional auger conveyer trough to provide an opening in the bottom thereof, according to the invention the portions of the side walls of the trough adjacent the opening are also modified. Initially, the side wall of the trough toward which material in the trough would normally be directed, i.e. the side wall 2 in view of the direction of rotation indicated by the arrow 16, is provided with a laterally extending plate 17 which covers approximately one-half of the portion of the auger 6 overlying the opening 15. The plate 17, which is fastened to the side wall 2 in any conventional manner, for example by welding as shown, extends from the side wall 2 so that it is parallel to a tangent to the periphery of the auger helix 12, i.e. the edge 18 of the plate 17 is perpendicular to a radius of the auger helix 12 at the point of tangency, and with the edge 18 terminating at the point of tangency. In the preferred illustrated embodiment of the invention, the plate 17 extends parallel to a tangent to the auger helix 12 at the uppermost point thereof and covers one-half of the auger, i.e. the edge 18 terminates at and is perpendicular to a radius of the auger helix 12 lying along a vertical center line of the auger. The clearance of spacing between the bottom of the plate 17 and the periphery of the auger helix 12 must be substantially less than the thickness of the runners or parts to be supplied to the trough. Preferably, the clearance is made as small as possible within the machining tolerances of the parts, and which typically have a value of approximately 1/100ths of an inch or less. In this way, any runners which are engaged by the auger helix during the rotation thereof will be prevented from being carried by the auger helix into the portion of the trough adjacent the side wall 2, and possibly falling out of the opening 15.

For ease in manufacturing, and also to prevent any parts which may pass between the blades of the auger helix to the space between the helix and the side wall 3 from being damaged, according to the invention, the portion of the side wall 3 adjacent the opening 15 is removed and the plate 17 is provided as one leg of a right angle plate, the other leg 19 of which extends downwardly, as shown, beyond the outer surface of the side wall 2, thereby additionally enlarging the width of the discharge opening 15.

In order to permit the sorting of molded parts and runners, and at the same time preventing molded parts from being caught or damaged between the periphery of the auger helix and the side wall 3, the portion 20 of the side wall 3 extending along the length of the opening 15 is provided with a lesser angle of inclination than the remainder of the side wall 3. End plates 21 and 22 are provided to connect the portion 20 to the remainder of the side wall 3 and to the end wall 5. The inclined side wall portion 20 preferably forms an angle of approximately 50° with a horizontal plane containing the axis of rotation of the auger 6 and extends below the plane to a point adjacent the periphery of the auger helix 12 which is perpendicular to a radius of the auger helix. Thereafter, the portion 12 may be provided as shown with a downwardly extending flange 24 which defines one edge of the opening 15. In order to prevent any runners from sliding along the surface of the portion 20 below the auger 6 and out of the opening 15, a circular rod 25 is fastened to the inclined side wall portion 20 at the lower end thereof. The rod 25, which is shown is preferably welded to the side wall portion 20, extends along the entire length of the opening 15 parallel to the axis of rotation of the auger 6.

As a result of the fact that the inclined side wall portion 20 has a lesser angle of inclination than the remainder of the side wall 3, an undesirable corner would normally be formed at the junction of the portion 3 and the side plate 21 which would tend to impair the proper operation of the device. In particular, runners being carried along by the auger helix would tend to strike the end plate 21 and thus not be conveyed to the grinder, and in fact might be caused to be rotated whereby they could fall between the blades of the auger helix. Additionally, molded plastic parts sliding down the inclined portion 20 adjacent the end plate 21 might be carried along by the auger helix 12 into the grinder. In order to eliminate this undesirable corner, therefore, a plate 26 is provided diagonally across the corner with the slope of the plate being such as to direct any part striking same downwardly and inwardly toward the portion of the auger 6 overlying the opening 15.

In order to direct the parts and runners being discharged from a molding machine and which are to be sorted into the proper portion of the trough 1, an inclined plate 28 which extends upwardly above the top of the trough 1 is fastened to the side wall 2. Preferably, as illustrated, the plate 28 is formed of two portions 29 and 30 which are joined together by means of a spring hinge 31 so that the trough may be easily placed beneath devices of different height. Although the plate 28 is shown as being fastened to the upper end of the side wall 2, it is to be understood that plate 28 may also, if desired, be fastened to the upper surface of the plate 17.

In order to use the auger conveyer as modified according to the invention for the sorting of parts and runners, as indicated above the pitch of the auger helix must be selected to be smaller than the length of the runners 14 to be supplied thereto. With this relationship between the pitch of the auger helix 12 and the length of the runners 14, when the molded parts and runners are supplied to the portion of the trough 1 overlying the discharge opening 15 and with the auger 6 rotating in a direction of the arrow 16, any parts supplied to the trough will simply pass between the blades of the auger helix and out through the opening 15 to a receptacle (not shown) placed therebelow. On the other hand, the runners whose length is greater than the pitch of the auger helix 12, and consequently cannot pass through the auger helix to the opening 15, will be conveyed in the conventional manner along the trough to the grinder. Moreover, any runners which should happen to align themselves along the surface 20 with the axis of rotation of the auger 6 will be prevented from passing through the opening 15 by the rod 26, and consequently will again eventually be conveyed by the auger to the grinder.

It will be understood that the above description of the present invention is susceptible to various modifications, changes and adaptations, and the same are intended to be comprehended within the meaning and range of equivalents of the appended claims.

I claim:

1. For use with a grinder for the plastic waste runners resulting from a multi-cavity injection molding process, a sorting-conveyor for automatically sorting the molded parts from the runners and for conveying the runners to the grinder, comprising in combination:

an elongated trough having opposed end walls one of which is provided with a circular opening and is connectable to the grinder, and first and second side walls with at least said first side wall being inclined and sloping downwardly and inwardly;

an auger disposed in the bottom of said trough and having one end thereof extending through said opening, the pitch of the auger helix being less than the length of the runners and greater than the length of the molded parts to be separated;

means for rotatably mounting the opposite end of said auger in the other of said end walls;

an elongated opening of a width sufficient to pass the molded parts in the bottom of said trough beneath said auger and extending from said other end wall along a substantial portion of the length of said auger;

a plate fastened to said second side wall of said trough and extending laterally therefrom so as to cover at least one-half of said auger, the clearance between said plate and said auger being substantially less than the thickness of a runner; and means fastened to said first side wall below the locus of the longitudinal axis of said auger and extending along the entire length of said opening for preventing any runners from sliding along said first side wall and through said opening, whereby when the auger is rotated in a direction toward the edge of said plate, the molded parts supplied to said trough will fall through the auger helix and out the bottom opening in the trough while the runners supplied to said trough will be carried along by the auger toward the end wall which is fastened to the grinder.

2. The automatic sorting-conveyor apparatus defined in claim 1 wherein said means for preventing comprises a rod fastened to said first side wall and extending therealong substantially parallel to the axis of rotation of said auger, the clearance between said rod and said auger being less than the thickness of a runner.

3. The automatic sorting-conveyer as defined in claim 2 wherein at least the portion of said first side wall which extends along said opening has a slope such that it is perpendicular to the radius of said auger passing through said rod, and forms an angle of approximately 50° with a horizontal plane containing said longitudinal axis of said auger.

4. The automatic sorting-conveyer apparatus defined in claim 1 wherein said plate is parallel to a tangent to said auger at the uppermost point thereof and covers one-half of said auger.

5. The automatic sorting-conveyor apparatus defined in claim 4 wherein: said means for preventing comprises a rod fastened to said first side wall and extending therealong substantially parallel to the axis of rotation of said auger, the clearance between said rod and said auger being less than the thickness of a runner; and at least the portion of said first side wall which extends along said opening has a slope such that it is perpendicular to the radius of said auger passing through said rod, and forms an angle of approximately 50° with a horizontal plane containing said longitudinal axis of said auger.

6. The automatic sorting-conveyer apparatus as defined in claim 1 wherein the portion of said first side wall which extends along said opening has a slope with respect to a horizontal plane which is less than that of the remainder of said first side wall; and further comprising a plate forming a sloped surface provided in the corner of said trough formed at the junction of said portions of said first side wall and on said first portion of said first side wall, said plate sloping downwardly and inwardly so as to direct any parts or runners contacting same toward the portion of the auger overlying said opening.

7. The automatic sorting-conveyer apparatus defined in claim 1 further comprising slide surface means fastened to said second side wall and extending upwardly above the upper edge of said trough for directing molded parts and runners placed thereon into said trough and toward said auger.

8. The automatic sorting-conveyer apparatus defined in claim 6 wherein said slide surface means comprises an inclined plate fastened to the upper edge of said second side wall.

* * * * *